US009223806B2

(12) United States Patent
Chtrasberg et al.

(10) Patent No.: US 9,223,806 B2
(45) Date of Patent: Dec. 29, 2015

(54) RESTARTING A BATCH PROCESS FROM AN EXECUTION POINT

(71) Applicant: International Business Machines Corporation, Armonk, NY (US)

(72) Inventors: Grigori Chtrasberg, Haifa (IL); Ronen I Kat, Kfar-Saba (IL); Moshe Klausner, Ramat Yishay (IL); Nitzan Peleg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 13/851,974

(22) Filed: Mar. 28, 2013

(65) Prior Publication Data
US 2014/0297594 A1 Oct. 2, 2014

(51) Int. Cl.
*G06F 7/00* (2006.01)
*G06F 17/00* (2006.01)
*G06F 17/30* (2006.01)

(52) U.S. Cl.
CPC .... *G06F 17/30289* (2013.01); *G06F 17/30377* (2013.01)

(58) Field of Classification Search
CPC ......................... G06F 17/3038; G06F 17/30368
USPC .......................................................... 707/643
See application file for complete search history.

(56) References Cited

U.S. PATENT DOCUMENTS

| 7,895,474 | B2 | 2/2011 | Collins et al. |
| 2003/0217033 | A1* | 11/2003 | Sandler et al. ..................... 707/1 |
| 2008/0120618 | A1 | 5/2008 | Collins et al. |
| 2008/0276239 | A1* | 11/2008 | Collins et al. ................. 718/101 |
| 2010/0287553 | A1 | 11/2010 | Schmidt et al. |
| 2011/0016354 | A1* | 1/2011 | Douros et al. .................. 714/16 |
| 2014/0289188 | A1* | 9/2014 | Shimanovsky et al. ....... 707/609 |

* cited by examiner

*Primary Examiner* — Marc Somers
(74) *Attorney, Agent, or Firm* — Jason H. Sosa

(57) ABSTRACT

Batch processing machines, systems and methods are provided. The method comprises copying target data from a target location to a first data storage medium, wherein the target data stored in the first data storage medium is utilized by a batch process; executing the batch process; checkpointing state information for the batch process at one or more time intervals while the batch process is executing; determining whether a data record in the target data stored in the target location was updated while the batch process was executing; and reinstating the batch process from a point in time prior to an earliest point in the batch process when a representation of an updated data record in the target data in the target location was accessed by the batch process.

20 Claims, 6 Drawing Sheets

RESTARTING A BATCH PROCESS FROM AN EXECUTION POINT

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to efficient batch processing in a computing environment and, more particularly, to a system and method for restarting a batch process from a point in time when an updated data relevant to the batch process was accessed.

BACKGROUND

A batch process refers to computing processes that are executed to perform a series of operations. A batch process may copy data stored in a database into memory and perform the operations on the copy of the data in memory. If during the batch process, the original data in the database is updated as a result of ongoing transactions, the resulting update to the data in the database is not reflected in the calculation performed by the batch process, because copy of the data in memory is not updated from the database, while the batch process is executing.

To avoid data inconsistency and inaccurate results, one solution is to stop all ongoing transactions performed on target data in the database, that may be utilized by the batch process. This is less than satisfactory, as it results in system downtime and delays associated with processing the incoming transactions. It is possible to continue the transactions, if the computations that the batch process performs do not rely on data that is updated by the transactions. If the target data is updated while the batch process is running, however, the batch process will have to be restarted from the beginning

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, batch processing machines, systems and methods are provided. The method comprises copying target data from a target location to a first data storage medium, wherein the target data stored in the first data storage medium is utilized by a batch process; executing the batch process; checkpointing state information for the batch process at one or more time intervals while the batch process is executing; determining whether a data record in the target data stored in the target location was updated while the batch process was executing; and reinstating the batch process from a point in time prior to an earliest point in the batch process when a representation of an updated data record in the target data in the target location was accessed by the batch process.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
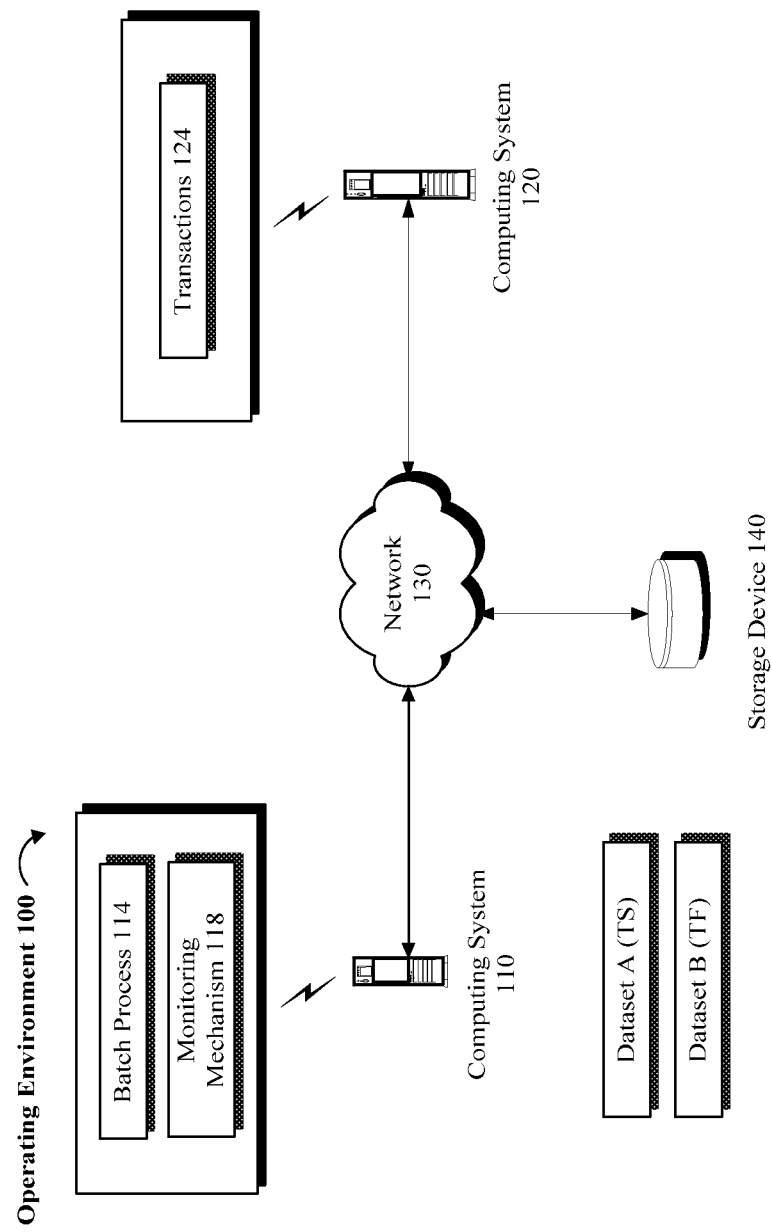
FIG. 1 illustrates an example computing environment in accordance with one or more embodiments, wherein batch process is executed.

Referring to FIG. 1, an exemplary operating environment 100 is illustrated in which a batch process 114 is executed on a computing system 110 to process data stored in a storage device 140. Transactions 124 may be executed on one or more computing systems (e.g., computing system 120), wherein the transactions result in updates to data stored in storage device 140, for example.

In accordance with one embodiment, the computing systems 110 and 120 and storage device 140 may be connected in a network 130. It is desirable to run the batch process 114 on a copy of the target dataset stored in storage device 140, such that if some of the data in the target dataset is updated by transactions 124 (i.e., while the batch process is running), then there would be no need to have to restart the batch process from the beginning. A monitoring mechanism 118 may be provided to monitor a point in time when the batch process accesses a data record.

Figure 2A:
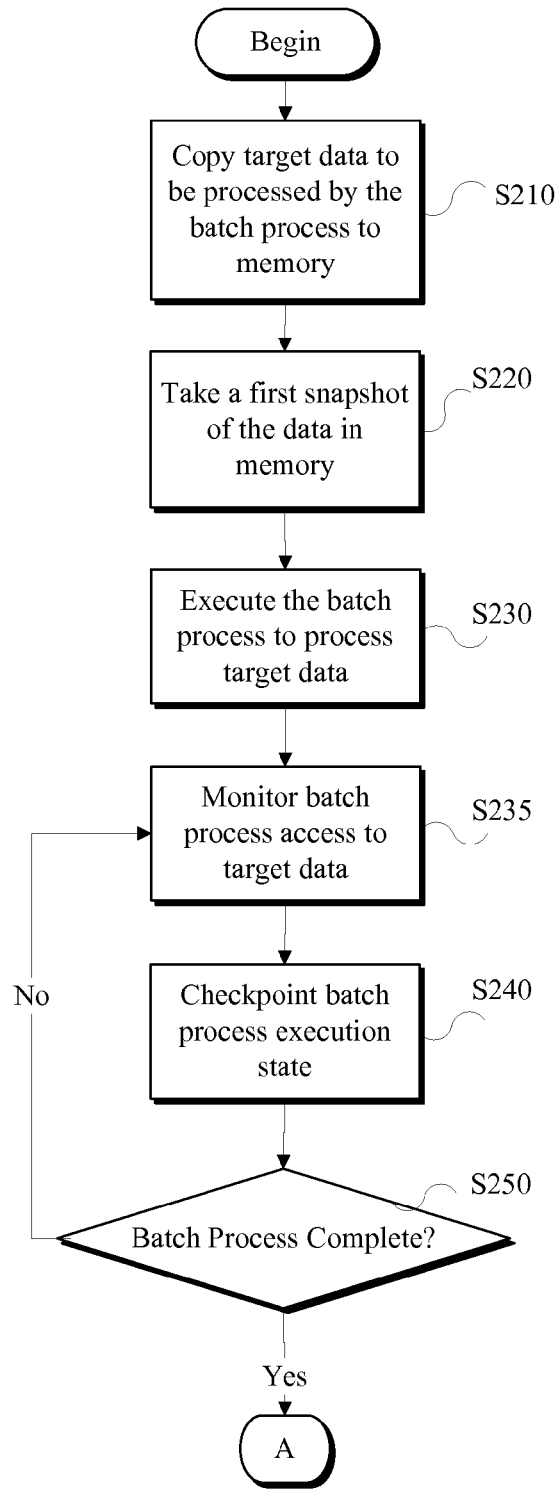
FIGS. 2A and 2B are flow diagrams of example methods of monitoring changes to data used by a batch process, in accordance with one embodiment.
Figure 2B:
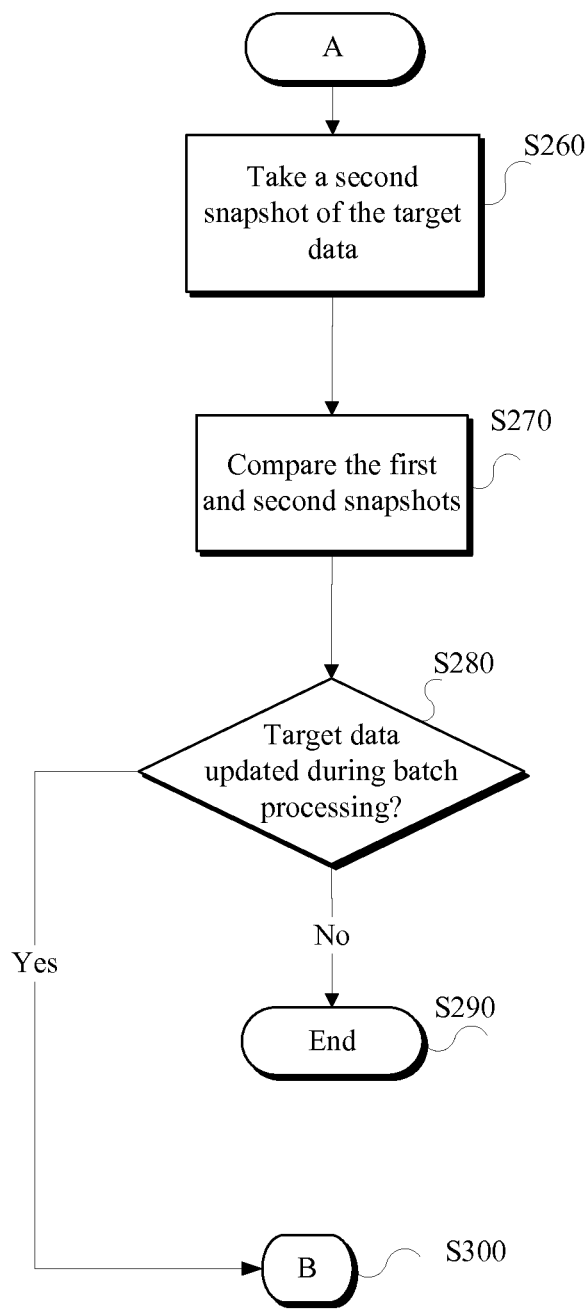

Referring to FIGS. 2A and 2B, at a time TS, prior to the batch process 114 being executed, the target data is copied from storage device 140 into a first data storage medium (e.g., memory) to which computing system 110 has access (S210). The memory may include a representation of the data in the target dataset, the address space allocated to the batch process and the related temporary files utilized during the batch process execution. In one embodiment, a first snapshot of the data stored in the memory is taken before the batch process 114 is started (S220). We refer to this first snapshot, which includes a copy of the target data at time TS, as dataset A.

After the first snapshot is taken, the batch process 114 is executed to process the target data (S230). Batch processing may continue after the first checkpoint, and additional checkpoints may be performed along the way until the batch process is completed (or at least partially completed). During the execution of the batch process, monitoring mechanism 118 may monitor a point in time when the batch process accessed a data record in the target data (S235) and, for example, apply access order information (e.g., a timestamp) to the particular data record. In this manner, the access time by the batch process to data records in dataset A, stored in memory, is recorded by the monitoring mechanism 118.

In one implementation, a scheme (e.g., a checkpoint mechanism) is utilized to create checkpoints (e.g., backup) of the state of execution of the batch process 114 along the time of execution of the batch process 114 (S240), such that the batch process 114 may be restarted from any of the checkpoint states, if needed, at a later time. In other words, at predetermined time intervals or points in execution, data related to the state of the batch process 114 (e.g., data stored in CPU registers, relevant data structures, data in relevant buffers, etc.) is backed up, so that the data may be used to reinstated the batch process 114 from a specific point during the execution of the batch process 114.

It is noteworthy that while the batch process 114 is running, transactions 124 may apply changes to the target data stored in storage device 140. Such changes would not be reflected in dataset A stored in memory. Depending on implementation, the batch process 114 may continue running regardless of the changes made to the target data in storage device 140, during the execution of the batch process 114. At a time TF, when the batch process 114 is completed (S250), a second snapshot of the target data in storage device 140 is taken and is optionally stored in a second data storage medium to which computing system 110 has access (S260). We refer to this second snapshot which includes a copy of the target data in storage device 140 at time TF as dataset B.

To elaborate, it is noted that dataset A is the version of the target data which was copied to the first data storage medium at the time TS (e.g., the first snapshot of the target data at a time prior to when the batch process started) and dataset B is the version of the target data that is copied to the second data storage medium at the time TF (e.g., the second snapshot of the target data taken after the time TS when the batch process started). As such, dataset A includes the version of target data used by the batch process to which no transactions 124 are applied; and dataset B includes the version of target data to which transactions 124 (if any) were applied between the time TS and the time TF.

To determine if any transactions resulted in changes to the target data stored on storage device 140 during the batch process, the first snapshot (i.e., dataset A) is compared with the second snapshot (i.e., dataset B) (S270). This comparison will help determine whether any of the data records (or data chunks) in the target data stored in storage device 140 were updated while the batch process was running (S280). It is noteworthy that mechanisms other than the snapshot technique disclosed above may be used to determine which data records have been changed. In response to determining that the target data on storage device 140 remains unchanged between TS and TF, the batch process is deemed completed (S290), otherwise alternative action is taken (S300).

Figure 3:
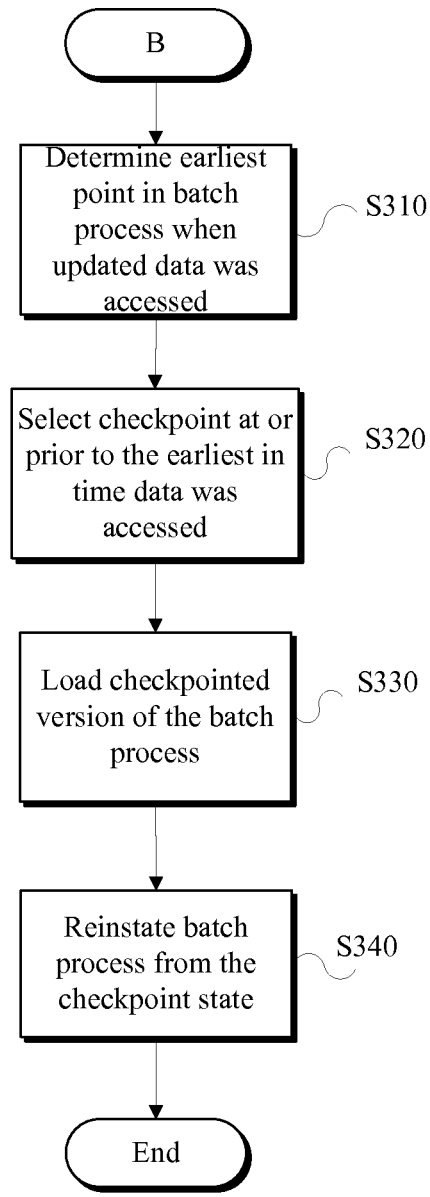
FIG. 3 is a flow diagram of an example method for reinstating a batch process, in accordance with one embodiment.

Referring to FIG. 3, if it is determined that the target data was updated during the batch process execution, then it is determined which one of the data records (or data chunks) in the target data was accessed by the batch process (e.g., for a read operation) earliest in time, during the execution of the batch process (S310) based on the monitoring information collected by monitoring mechanism 118. Comparison results between the first snapshot (dataset A) and the second snapshot (dataset B) may indicate that data records or chunks D4, D8 and D10 were changed during execution of the batch process 114. Once it is determined which data records have been change, it is desirable to determine which of the changed data records was accessed by the batch process earliest in time, so that the batch process may be reinstated from that point in time.

In one example implementation, the monitoring mechanism 118 may add access order information (e.g., a timestamp) to each record that is accessed by the batch process to indicate the time of access. In the above example, referring to updated data records D4, D8 and D10, information collected by the monitoring mechanism 118 may indicate that D4 was accessed by the batch process at time T4 during the batch process execution, D8 was accessed at time T8, and D10 was accessed at time T10, for example. As such, the timestamp T4 associated with D4 may indicate that D4 was the record that was accessed by the batch process earliest in time, when the timestamp T4 is compared to timestamps T8 and T10, for example. If so, then the execution point at time T4 is selected as the earliest time.

By way of example, if the batch process between times TS and TF was checkpointed N times during its execution, then a checkpoint X is selected where the time of the checkpoint TX for checkpoint X is prior to the time of the earliest access by the batch job to the target data (S320). In the above example, the checkpoint version of the batch file is selected where TX<T4, for example. Accordingly, the selected checkpointed version of the batch process (e.g., checkpoint X) is then loaded into memory and is executed (S330). In this manner, the batch process is reinstated from the checkpoint state at or prior to the earliest point in batch process when the target data was changed, during the execution of the batch process (S340). In other words, the batch process, instead of being executed from the beginning, is partially executed from the execution point in time TX forward, during the second run (i.e., a subsequent run).

After we restart the batch process from the check point, the related data for the batch process returns to the same state as in the previous run, including the execution space and also the values stored in memory for data in target data that was changed (e.g., D4, D8 and D10) during the prior batch run. Therefore, to take into account the changes to the target data during a subsequent batch run from the checkpoint, after the subsequent batch process is reinstated from the checkpoint, the updated data values (e.g., D4, D8 and D10) are applied to the dataset on which the subsequent batch process will be running on. In other words, the batch process during the subsequent run will apply to the updated values of the data.

If in a subsequent run, the target data remains unchanged, then the batch process is deemed complete. However, if more changes to target data are detected, the above process of rerunning the batch process from the earliest checkpoint in time when no changes are made during the execution of the batch process may continue, iteratively if needed, until it is determined that no data that influences the batch process was changed or updated during the previous run. At that point the batch process is deemed complete.

In one embodiment, a list of relevant checkpoints and the monitoring data during the time TS to TF may be maintained. In this scenario, if the batch process is reinstated from a checkpoint TX, then checkpoint data that is subsequent in time to TX is deleted; and checkpoint data that precedes TX in time is maintained. In addition, the monitoring data that preceded TX is maintained. In other words, checkpoints that are between times TS and TX are preserved and checkpoints that are between times TX and TF are deleted. This is because checkpoints that are performed and monitoring data that is collected after the target data was updated at the earliest time TX are no longer valid for the purpose of reinstating the batch process.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
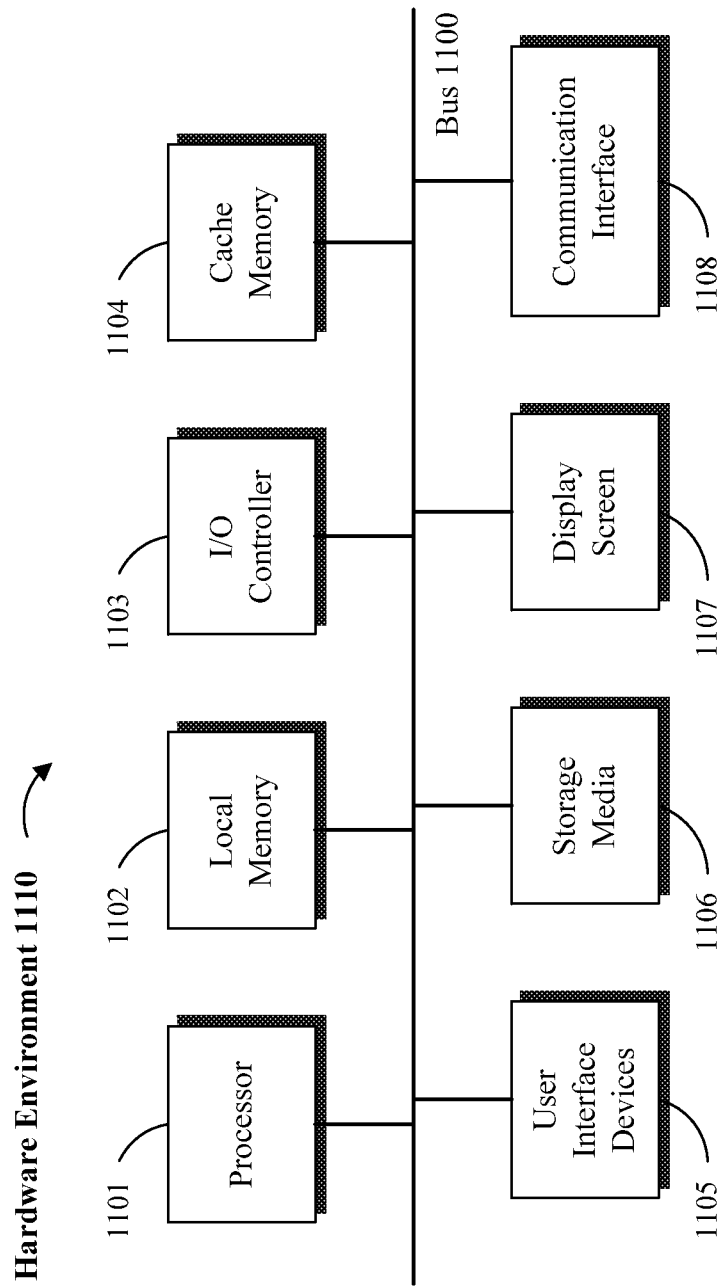
FIGS. 4A and 4B are block diagrams of hardware and software environments in which the disclosed systems and methods may operate, in accordance with one or more embodiments.
Figure 4B:
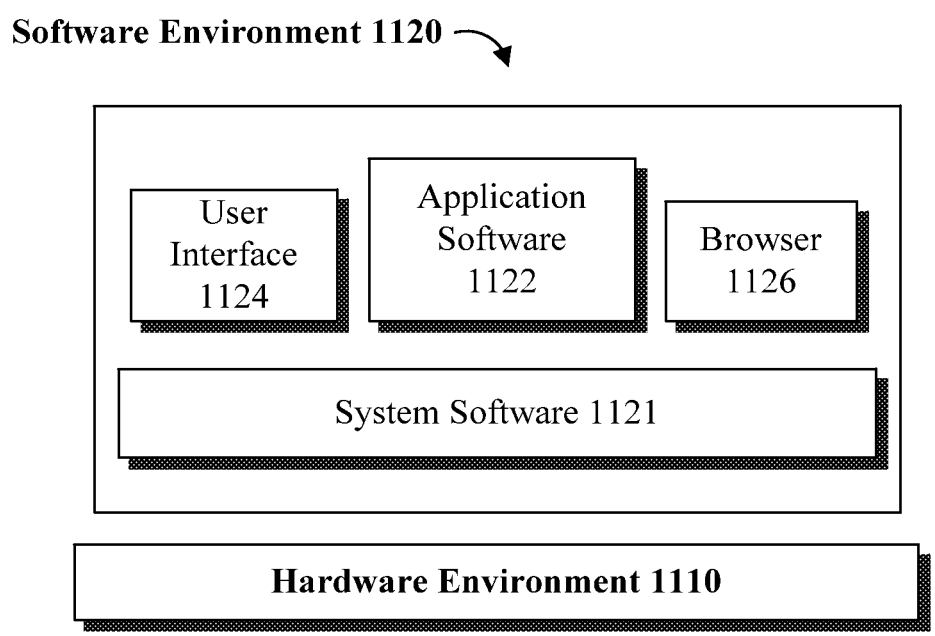

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipment that provide an execution environment for the components of software environment 1120. In turn, the software environment 1120 may provide the execution instructions, including the underlying operational settings and configurations, for the various components of hardware environment 1110. As used herein, a "logic unit" refers to tangible hardware that may be, for example, a collection of hardwired logic circuits designed to perform a specified function, or alternatively, a physical storage element containing instructions for execution by a processor, which when executed performs the specified function.

Referring to FIG. 4A, the application software and logic code disclosed herein may be implemented in the form of machine readable code executed over one or more computing systems represented by the exemplary hardware environment 1110. As illustrated, hardware environment 1110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain or store program code.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. As used herein, a computer-readable storage medium is hardware and is not to be construed as being a transitory signal per se, such as radio waves or other freely propagating electromagnetic waves, electromagnetic waves propagating through a waveguide or other transmission media (e.g., light pulses passing through a fiber-optic cable), or electrical signals transmitted through a wire.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A batch processing method comprising:
    copying target data from a target location to a first data storage medium, wherein the target data stored in the first data storage medium is utilized by a batch process;
    executing the batch process;
    checkpointing state information for the batch process at one or more time intervals while the batch process is executing;
    determining whether a data record in the target data stored in the target location was updated while the batch process was executing; and
    reinstating the batch process from a point in time prior to an earliest point in the batch process when a representation of an updated data record in the target data in the target location was accessed by the batch process.

2. The method of claim 1, wherein the representation of the updated data record in the target data corresponds to a copy of the data record in the target data that was stored in the first data storage medium prior to executing the batch process.

3. The method of claim 1, wherein the reinstating is performed based on the checkpointed state information.

4. The method of claim 3, wherein the checkpointing was performed prior to the earliest point in the batch process when the representation of the updated data record in the target data in the target location was accessed by the batch process.

5. The method of claim 1, wherein a first snapshot is taken of the copy of target data in the first data storage medium, prior to executing the batch process.

6. The method of claim 5, wherein a second snapshot is taken of the target data in the target location with which the data in the first snapshot correspond, after the batch process has completed execution.

7. The method of claim 6, wherein data records in the first snapshot are compared with data records in the second snapshot to determine whether, while the batch process was being executed, any changes were made to the data records in the target data in the target location with which the data records in the first snapshot correspond.

8. The method of claim 7, wherein access order information is applied to data records in the first data storage medium to indicate an access point in time representing a time when a data record in the first data storage medium was processed by the batch process.

9. The method of claim 8, wherein in response to determining that changes were made to one or more data records in the target data in the target location during the execution of the batch file, the access order information associated with the corresponding representations of the one or more data records in the first snapshot are checked to select one of said one or more data records that was updated earliest in time, wherein the access order information associated with the selected data record represents the earliest point in the batch process when the representation of an updated data record in the target data in the target location was accessed by the batch process.

10. The method of claim 9, wherein one or more data records in the first snapshot are updated according to the changes that were made to the corresponding one or more data records in the target data in the target location during the execution of the batch process when the batch process is reinstated.

11. A batch processing system comprising:
    a logic unit for copying target data from a target location to a first data storage medium, wherein the target data stored in the first data storage medium is utilized by a batch process;
    a logic unit for executing the batch process;
    a logic unit for checkpointing state information for the batch process at one or more time intervals while the batch process is executing;
    a logic unit for determining whether a data record in the target data stored in the target location was updated while the batch process was executing; and
    a logic unit for reinstating the batch process from a point in time prior to an earliest point in the batch process when a representation of an updated data record in the target data in the target location was accessed by the batch process.

12. The system of claim 11, wherein the representation of the updated data record in the target data corresponds to a copy of the data record in the target data that was stored in the first data storage medium prior to executing the batch process.

13. The system of claim 11, wherein the reinstating is performed based on the checkpointed state information.

14. The system of claim 13, wherein the checkpointing was performed prior to the earliest point in the batch process when the representation of the updated data record in the target data in the target location was accessed by the batch process.

15. The system of claim 11, wherein a first snapshot is taken of the copy of target data in the first data storage medium, prior to executing the batch process.

16. A computer program product comprising a computer readable storage medium having a computer readable program, wherein the computer readable program when executed on a computer causes the computer to:
    copy target data from a target location to a first data storage medium, wherein the target data stored in the first data storage medium is utilized by a batch process;
    execute the batch process;
    checkpoint state information for the batch process at one or more time intervals while the batch process is executing;
    determine whether a data record in the target data stored in the target location was updated while the batch process was executing; and
    reinstate the batch process from a point in time prior to an earliest point in the batch process when a representation of an updated data record in the target data in the target location was accessed by the batch process.

17. The computer program product of claim 16, wherein the representation of the data record in the target data corresponds to a copy of the updated data record in the target data that was stored in the first data storage medium prior to executing the batch process.

18. The computer program product of claim 16, wherein the reinstating is performed based on the checkpointed state information.

19. The computer program product of claim 18, wherein the checkpointing was performed prior to the earliest point in the batch process when the representation of the updated data record in the target data in the target location was accessed by the batch process.

20. The computer program product of claim 16, wherein a first snapshot is taken of the copy of target data in the first data storage medium, prior to executing the batch process.

* * * * *